United States Patent
Furukawa et al.

(10) Patent No.: US 8,767,373 B2
(45) Date of Patent: Jul. 1, 2014

(54) TUNABLE CAPACITOR

(75) Inventors: Yukiko Furukawa, Kimitsu (JP); Klaus Reimann, Eindhoven (NL); Friso Jacobus Jedema, Eindhoven (NL); Markus Petrus Josephus Tiggelman, Eindhoven (NL); Aarnoud Laurens Roest, Geldrop (NL)

(73) Assignee: NXP, B.V., Eindhoven (NL)

( * ) Notice: Subject to any disclaimer, the term of this patent is extended or adjusted under 35 U.S.C. 154(b) by 567 days.

(21) Appl. No.: 12/990,044

(22) PCT Filed: Apr. 29, 2009

(86) PCT No.: PCT/IB2009/051740
§ 371 (c)(1),
(2), (4) Date: Nov. 11, 2010

(87) PCT Pub. No.: WO2009/136320
PCT Pub. Date: Nov. 12, 2009

(65) Prior Publication Data
US 2011/0051309 A1    Mar. 3, 2011

(30) Foreign Application Priority Data
May 8, 2008 (EP) .................... 08155869

(51) Int. Cl.
H01G 5/00    (2006.01)

(52) U.S. Cl.
USPC ........... 361/277; 361/280; 361/281; 361/282; 361/298.3

(58) Field of Classification Search
USPC .............. 361/277, 280, 281, 282, 298.3
See application file for complete search history.

(56) References Cited

U.S. PATENT DOCUMENTS 5,079,200 A    1/1992 Jackson
6,818,469 B2 *  11/2004 Mori et al. ............... 438/52

(Continued)

FOREIGN PATENT DOCUMENTS

GB    905563 A    9/1962
GB    2173038 A    10/1986

(Continued)

OTHER PUBLICATIONS

Merz, Walter J.; "The Electric and Optical Behavior of BaTiO3 Single-Domain Crystals"; Physical Review, vol. 76, No. 8; 10 pages (Oct. 15, 1949).

(Continued)

Primary Examiner — Robert J Hoffberg
Assistant Examiner — Hung Dang (57) ABSTRACT

The invention relates to electronic device having an operation temperature range, wherein the electronic device comprises a tunable capacitor (CST) comprising a first electrode (BE), a second electrode (TE), and a dielectric (FEL) arranged between the first electrode (BE) and the second electrode (TE). The dielectric (FEL) comprises dielectric material (FEL) having a value of a relative dielectric constant ($\epsilon_r$) varying at least within the operation temperature range. The electronic device further comprises a temperature varying means (RES) being thermally coupled to the tunable capacitor for providing a temperature of the dielectric (FEL) causing a predetermined capacitance of the tunable capacitor (CST). The invention, which relies on the idea of varying temperature to vary a capacitance of a capacitor stack, provides an alternative tunable capacitor type for the known types. Advantageous embodiments feature high-tuning ratio, small device area, and stable capacitance value in case the temperature is well controlled. The invention further relates to a semiconductor device comprising the electronic device in accordance with the invention, to an electronic circuit comprising such electronic device, and to a method of manufacturing such electronic device.

10 Claims, 5 Drawing Sheets

(56) References Cited

U.S. PATENT DOCUMENTS 7,518,849 B2 * 4/2009 Ito et al. .................... 361/321.2
2005/0279939 A1 12/2005 Yoshida et al.

FOREIGN PATENT DOCUMENTS

GB 2190076 A 11/1987
JP 62171461 A 7/1987
JP 2005347849 12/2005

OTHER PUBLICATIONS

Kingery, W.D.; "Introduction to Ceramics—p. 968-971"; John Wiley & Sons (1976).
Wu, Huey-Daw, et al; "Voltage Tunable Capacitors Using High Temperature Superconductors and Ferroelectrics"; IEEE Transactions on Applied Superconductivity; IEEE Service Center, Los Alamitos, CA, US; vol. 4, No. 3; pp. 156-160 (Sep. 1, 1994).
Tombak, Ali, et al; "Voltage-Controlled RF Filters Employing Thin-Film Barium-Strontium-Titanate-Tunable Capacitors"; IEEE on Microwave Theory and Techniques, vol. 51, No. 2; Piscataway, NJ, US; 6 pages; (Feb. 2003).
Shakhari, Maxim V.; "Microelectromechanical (MEMS) Varactors for Mobile Communications"; $4^{th}$ Annual 2003 Siberian Russian Workshop on Electron Devices and Materials; IEEE, Piscataway, NJ, US (Jul. 2003).
Marsan, Eric, et al; "Tunable Microwave Device: Status and Perspecitve"; IEEE-NEWCAS Conference 2005, $3^{rd}$ Intl, vol. 19; p. 279-282 (Jun. 2005).
International Search Report for Application PCT/IB2009/051740 (Sep. 10, 2009).

* cited by examiner

TUNABLE CAPACITOR

FIELD OF THE INVENTION

The invention relates to electronic device having an operation temperature range, the electronic device comprising: a capacitor comprising a first electrode, a second electrode, and a dielectric arranged between the first electrode and the second electrode, wherein the dielectric comprises dielectric material. The invention further relates to a semiconductor device comprising such electronic device, and to an electronic circuit comprising such electronic device. The invention also relates to a method of manufacturing such electronic device.

BACKGROUND OF THE INVENTION

Several types of tunable capacitors have been developed for mobile communication applications such as tunable filters, phase shifters, multiplexers, voltage-controlled oscillators and tunable matching networks.

A first type is a semiconductor based tunable capacitor, i.e. PIN diodes, varactor diodes and field-effect transistors (FET's). A second type is a MEMS type tunable capacitor, which has a possibility to gain a large change of capacitance due to change of a distance between electrodes or in plane relative position of the electrodes (an in-plane translation of the bottom or top electrode may result in a change of the effective overlapping area of the capacitor and thus vary the capacitance). A third type is a tunable capacitor using ferroelectric material sandwiched between two electrodes. In that type of capacitor the relative dielectric constant of the ferroelectric material is varied by applying an electric field (which is done by applying a voltage over the electrodes). All three types of tunable capacitors have their own limitations in operational use.

In view of these limitations there is a need for an alternative type of tunable capacitor.

SUMMARY OF THE INVENTION

It is an object of the invention to provide an alternative tunable capacitor.

The invention is defined by the independent claims. The dependent claims define advantageous embodiments.

In a first aspect, the invention relates to electronic device having an operation temperature range, the electronic device comprising:

a tunable capacitor comprising a first electrode, a second electrode, and a dielectric arranged between the first electrode and the second electrode, wherein the dielectric comprises dielectric material having a value of a relative dielectric constant ($\in$r) varying at least within the operation temperature range, and a temperature varying means being thermally coupled to the tunable capacitor for providing a temperature of the dielectric causing a predetermined capacitance of the tunable capacitor.

The effect of the features of the electronic device in accordance with the invention is that a temperature-dependence of the relative dielectric constant of a dielectric material is exploited for creating a tunable/controllable capacitance. The temperature varying means sets a temperature of the dielectric and subsequently the capacitance of the capacitor assumes a value corresponding with that temperature. In other words, the invention provides a tunable capacitor which exploits temperature dependence of the relative dielectric constant for varying the capacitance, which is an alternative to the known tunable capacitors in which parameters like electrode distance dependency and electric field dependencies are used.

The earlier mentioned different types of tunable capacitors, together with their advantages and disadvantages, are discussed in the following scientific publication:

Marsan, E.; Gauthier, J.; Chaker, M.; Ke Wu, "*Tunable microwave device: status and perspective*", IEEE-NEWCAS Conference, 2005. The 3rd International, Volume/Issue, 19-22 Jun. 2005, p. 279-282. The semiconductor based tunable capacitors generally have a high tuning ratio (which is defined as the maximum achievable capacitance divided by the minimum achievable capacitance), a fast response time. However, their Q-factor is moderate and their power consumption is poor. The MEMS type tunable capacitors generally have a very high Q-factor and have excellent power consumption (extremely low). However, their tuning ratio is low and their response time is slow. The ferroelectric tunable capacitors have a relatively high (up to 3.5) tuning ratio, an excellent power consumption (extremely low), and a very fast response time. However, their Q-factor is moderate.

The inventors have identified further drawbacks in the MEMS type tunable capacitors, namely that they actually require an actuator to be controlled and, in order to achieve an electrostatic force which is larger than the mechanical forces a relatively big size of the actuator is required. A further drawback of the ferroelectric tunable capacitors, identified by the inventors, is that their tuning ratio is still relatively small. They have identified a need for much larger tuning ratios. In the discussion of the embodiments of the invention these issues will be, where applicable, further discussed because the invention creates new possibilities.

In an embodiment of the electronic device of the invention the temperature varying means comprises a resistive element for carrying a current to set the temperature. A resistive element carrying a current is a convenient means for heating the dielectric material and thereby varying the relative dielectric constant, because the current through the resistive element can be easily controlled. In a thermal system a predefined current strength will (after settling) result with a predefined temperature of the dielectric material. Consequently, this temperature will then comply with a predefined relative dielectric constant and a capacitance.

An embodiment of the electronic device of the invention further comprises a controller being coupled to the resistor and being arranged for controlling the temperature of the dielectric by steering the current through the resistive element. The use of a controller that steers a current through the heater enables a more accurate setting of the temperature, and also it enables more flexibility in varying the tunable capacitor over time. The controller may be part of a control system.

An embodiment of the electronic device of the invention further comprises a temperature sensor for measuring an actual value of the temperature of the dielectric material, wherein the controller is arranged for receiving from the temperature sensor a temperature signal indicative for the actual value of the temperature, the controller being further arranged for receiving a desired temperature signal indicative for a desired temperature, and wherein the controller is arranged for controlling the temperature to decrease an absolute difference between the temperature signal and the desired temperature signal. This embodiment constitutes a first example of a control system. In this embodiment a temperature error signal is determined and used for controlling the temperature.

An embodiment of the electronic device of the invention further comprises capacitance measurement circuitry for measuring an actual value of the capacitance, wherein the controller is arranged for receiving from the capacitance measurement circuitry a capacitance signal indicative for the actual value of the capacitance, the controller being further arranged for receiving a desired temperature signal indicative for a desired capacitance, and wherein the controller is arranged for controlling the temperature to decrease an absolute difference between the capacitance signal and the desired capacitance signal. This embodiment constitutes a second example of a control system. In this embodiment a capacitance error signal is determined and used for controlling the temperature.

In an embodiment of the electronic device of the invention the dielectric comprises ferroelectric material which exhibits a phase transition from a ferroelectric phase to a paraelectric phase in a temperature range from −50° C. to 250° C. Ferroelectric materials are known to have a relatively large temperature dependency of their relative dielectric constant. Especially those ferroelectric materials which show a phase transition and in particular in the temperature range from −50° C. to 250° C. are of interest, because this temperature range coincides with the operation temperature range. The dependency may be large both in absolute as well as relative terms. The absolute variation is the maximum relative dielectric constant achievable within the operation temperature range divided by the minimum relative dielectric constant achievable within the operation temperature range. A large relative temperature dependency means a large variation of the relative dielectric constant per degree Celsius (the derivative of the temperature dependency). Depending on the application one or both of these variations may be used. When the ferroelectric material exhibits a phase transition from a ferroelectric phase to a paraelectric phase this generally coincides with a very strong increase of the relative dielectric constant. The temperature at which this happens is also called the Curie temperature (Tc). Consequently, a very strong increase of the capacitance may be observed, which also means an extremely large tuning ratio which is much larger than what may be achieved with the known types of tunable capacitors. Another great advantage of a large dielectric constant is that the capacitor may be designed much smaller, which is a great advantage over the known tunable capacitor types. In order to be able to use this effect the temperature at which this phenomenon is observed lies preferably within or close to the operation temperature range of the electronic device, i.e. in the range from −50° C. to 250° C.

In an embodiment of the electronic device of the invention the ferroelectric material exhibits a phase transition from a ferroelectric phase to a paraelectric phase in a temperature range of 50° C. to 150° C. When the phase transition of the ferroelectric material occurs in the sub-range from 50° C. to 150° C., which coincides with the upper part of a conventional operation temperature range of an electronic device, it requires less effort (energy) to vary the capacitance of the capacitor. This feature generally implies that the temperature varying means only needs to heat (and not cool) the dielectric material with respect to the environment. A resistive element may be used as heater in that case. In a physical environment having a certain heat loss, cooling may be simply achieved with a heater by heating to a less extent (i.e. a smaller current through the resistive element).

In an embodiment of the electronic device of the invention the dielectric comprises ferroelectric dielectric material selected from a number of groups comprising: a tungsten-bronze group comprising $K_3Li_2Nb_5O_{15}$ and $Ba_2NaNb_5O_{15}$, a KDP group comprising $KH_2PO_4$, $KD_2PO_4$, $RbH_2PO_4$, and $KH_2AsO_4$, a $LiNbO_3$ group comprising $LiNbO_3$ and $LiTaO_3$, and a Perovskite group comprising $BaTiO_3$, $PbTiO_3$, and $KNbO_3$, and a $Pb_5Ge_3O_{11}$ group. These groups of ferroelectric materials have been identified by the inventors as exhibiting a significant variation of their relative dielectric constant with the temperature, wherein the respective ranges in which the most significant variation (and Curie temperatures) is seen are distributed over a range from −200° C. to 1300° C. Depending on the application a different material may be selected from these groups.

In an embodiment of the electronic device of the invention the dielectric material comprises material from the Perovskite group that complies with the following chemical formula: $XYO_3$, wherein X comprises and least one of Ba, Pb, Sr, Ca, and wherein Y comprises at least one of Sn, Hr, Zr, Ce, Ti, and Th. These Perovskite materials have been identified by the inventors, at least so far, to exhibit the strongest temperature dependence of their relative dielectric constant. The highest tuning ratio may be achieved using these materials.

In an embodiment of the electronic device of the invention X comprises $Ba_{1-x-y}Sr_xPb_y$ with $0 \leq x < 1$, $0 \leq y \leq 1$, $x+y \leq 1$. When starting from $BaYO_3$ material, the addition of lead (Pb) increases the Curie temperature (Tc), while the addition of strontium (Sr) decreases the Curie temperature (Tc). These two mechanisms may be used to tune the Curie temperature to a desired value.

In an embodiment of the electronic device of the invention Y comprises at least $Ti_{1-z}Zr_z$ with $0 \leq z \leq 1$. When starting from $XTiO_3$ material, the addition of zirconium (Zr) increases the peak value of the relative dielectric constant at the Curie temperature (Tc) and also broadens the peak. This mechanism may be used to tune the relative dielectric constant dependency to a desired dependency.

In a second aspect the invention relates to semiconductor device comprising the electronic device in accordance with the invention. When the electronic device is integrated with in a semiconductor device it may be advantageously integrated with electronic circuits.

An embodiment of the semiconductor device of the invention comprises a substrate with insulating material provided at a surface thereof, wherein the capacitor and the heater are arranged within the insulating material, and wherein the capacitor and the heater are thermally coupled to each other. In such a structure it is easy to control the temperature of the capacitor (and thereby the dielectric material). In practice, a substrate, for example a semiconductor substrate with an integrated circuit at a surface thereof, often comprises an insulating material by itself, for example in the back-end-of-line stack.

In an embodiment of the semiconductor device of the invention the insulating material comprises a cavity in which the capacitor and the heater are both arranged. When the heater and the capacitor are arranged in a cavity with for example air inside a system is created with very low heat loss. A lower heat loss will lead to a faster tunable capacitor as the temperature will settle much faster. A large heat loss enables to cool the material fast, however maintaining a temperature requires more energy.

In a third aspect the invention relates to an electronic circuit comprising the electronic device in according with the invention. Preferably, the electronic circuit is selected from a group comprising: tunable filter, phase shifter, multiplexer, voltage-controlled oscillator, and tunable matching network. Tunable capacitors have a very wide scope of application. The circuits mentioned here, are just a selection of some important ones.

In a third aspect the invention relates to a method of manufacturing an electronic device, wherein the method comprises steps of:

providing a tunable capacitor comprising a first electrode, a second electrode, and a dielectric arranged between the first electrode and the second electrode, wherein the dielectric comprises dielectric material having a value of a relative dielectric constant ($\in_r$) varying at least within the operation temperature range, and providing a temperature varying means being thermally coupled to the tunable capacitor for providing a temperature of the dielectric causing a predetermined capacitance of the tunable capacitor. The advantages of the method and its embodiments follow that of the corresponding electronic device.

These and other aspects of the invention are apparent from and will be elucidated with reference to the embodiments described hereinafter.

DETAILED DESCRIPTION OF THE PREFERRED EMBODIMENTS

The capacitance of a plate capacitor with a dielectric material between the capacitor plates is given by the following formula:

$$C = \in_0 \cdot \in_r \cdot A/t,$$

wherein C is the capacitance,
wherein $\in_0$ is the dielectric constant of vacuum,
wherein $\in_r$ is the relative dielectric constant of the dielectric material between the plates,
wherein A is the area of the plates, and
wherein t is the thickness of the dielectric material.

The invention relates to a tunable capacitor wherein a temperature dependency of a relative dielectric constant $\in_r$ of the dielectric material is exploited for varying the capacitance. In the electronic device according to the invention the relative dielectric constant is set by setting the temperature of the dielectric material, and thereby setting the capacitance of the capacitor using this dependency. Many dielectric materials exhibit a temperature dependent relative dielectric constant. Ferroelectric materials, however, have a relative dielectric constant that strongly depends on temperature, which is due to change of crystal structure which occurs at a certain temperature. For instance $BaTiO_3$, a typical Perovskite type ferroelectric material has a phase transition at a temperature of 120° C., which is called the Curie temperature Tc. At room temperature it has a tetragonal structure showing ferroelectric behavior, at temperatures above 120° C. it turns into a cubic structure showing paraelectric behavior.

Figure 1:
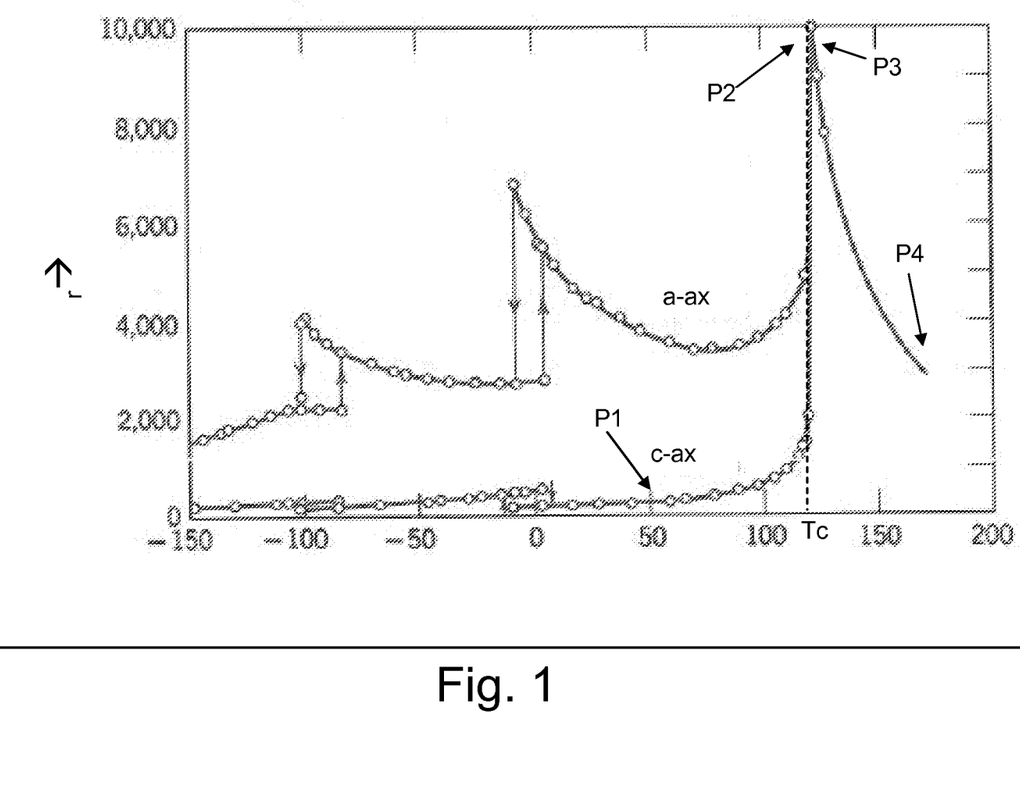
FIG. 1 shows the temperature dependence of the relative dielectric constant of $BaTiO_3$.

FIG. 1 shows the temperature dependence of the relative dielectric constant of $BaTiO_3$. Due to the phase transition occurring at 120° C. dielectric constant can be changed from 300 at a temperature of 50° C. (see point P1 in FIG. 1) to 10.000 at a temperature of 120° C. (see point P2 in FIG. 1). Theoretically it may even be possible to reach up to 100.000 for a single crystal material but most likely this is not feasible for thin film technology. In some embodiments of the electronic device in accordance with the invention the ferroelectric material is kept in the paraelectric phase above the Curie temperature Tc because of lower microwave losses in the paraelectric phase.

The invention is however much wider applicable than on $BaTiO_3$ materials. As far as the ferroelectric material is concerned, the inventors have identified the following candidates as possible dielectric materials:

from the Tungsten-Bronze group the materials $(K_3Li_2Nb_5O_{15}$ and $Ba_2NaNb_5O_{15}$;

from the KDP group the materials $KH_2PO_4$, $KD_2PO_4$, $RbH_2PO_4$, and $H_2AsO_4$;

from the $LiNbO_3$ group the materials $LiNbO_3$ and $LiTaO_3$;

from the Perovskite group the materials $BaTiO_3$, $PbTiO_3$, and $KNbO_3$, and $Pb_5Ge_3O_{11}$.

Of these materials the respective ranges in which the most significant variation (and Curie temperatures) is seen are distributed over a range from −200° C. to 1300° C. It is up to the designer to choose the material which has a dielectric constant versus temperature dependency which fits the application the best. While choosing a certain material the compatibility with the process technology being used is also important.

Within the above mentioned materials, the Perovskite group seems very promising. Within the Perovskite group a subgroup may be indicated with as general formula: $XYO_3$, wherein X comprises and least one of Ba, Pb, Sr, Ca, and wherein Y comprises at least one of Sn, Hr, Zr, Ce, Ti, and Th.

Starting from pure $BaTiO_3$, the Curie temperature Tc and the dielectric constant can be modified by forming a solid solution using additives such as Pb, Sr, Ca and Cd for the Ba site and Sn, Hr, Zr, Ce and Th for the Ti site 2. The addition of additives constitutes parameters which the designer may use to tune the temperature dependency to his own needs. It is considered as falling within the normal skill and expertise of the skilled person, when he knows that temperature dependency he is looking for, to consult chemical data books and find the right combination of materials.

Nevertheless, the inventors have identified the following subset as very promising: $XYO_3$, wherein X comprises $Ba_{1-x-y} Sr_x Pb_y$, with $0 \leq x < 1$, $0 \leq y \leq 1$, $x+y \leq 1$. When starting from $BaYO_3$ material, the addition of lead (Pb) increases the Curie temperature Tc, while the addition of strontium (Sr) decreases the Curie temperature Tc. These two mechanisms may be used to tune the Curie temperature to a desired value. It must be noted that pure $SrTiO_3$ (x=1) is not ferroelectric, which is the reason for the "<1" in the formula.

Moreover, for Y the following subset seems promising: $XYO_3$, wherein Y comprises at least $Ti_{1-z}Zr_z$ with $0 \leq z \leq 1$. When starting from $XTiO_3$ material, the addition of zirconium (Zr) increases the peak value of the relative dielectric constant at the Curie temperature Tc and also broadens the peak. This mechanism may be used to tune the relative dielectric constant dependency to a desired dependency.

Throughout this description the term "operation temperature range" refers to a temperature range in which an electronic device is normally designed to operate. In most applications this is considered to be from −50° C. to 250° C., and preferably this is between a temperature above room temperature (for example 50° C.) and 150° C.

Throughout this description the term "interconnect layer" should be considered as synonym to "metallization layer" or "metal layer". Both terms are used interchangeably and have to be interpreted as the layer comprising conductors, the insulating layer in which the conductors are embedded, and any vias (=contacts) to underlying layers. These terms are well-known to the person skilled in the art of semiconductor technology.

Throughout this description the term substrate should be interpreted broadly. The substrate may comprise in an active layer at its front-side elements, e.g. transistors, capacitors, resistors, diodes, and inductors, which form the components of an electronic circuit. The substrate may further comprise interconnections between the elements which may be laid out in one or more interconnect layers. In the figures, the elements have been left out in order to facilitate the understanding of the invention.

The active layer in which transistors, diodes, are formed may also be called a semiconductor body. The semiconductor body may comprise any one of the following semiconductor materials and compositions like silicon (Si), germanium (Ge), silicon germanium (SiGe), gallium-arsenide (GaAs) and other III-V compounds like indium-phosphide (InP), cadmium sulfide (CdS) and other II-VI compounds, or combinations of these materials and compositions. The active elements together may form an electronic circuit. In any case, connection of the active elements is done via interconnect layers. These interconnect layers have parasitic capacitances which are defined by the dielectric constant of surrounding materials. The semiconductor body may even comprise contacts to lower layers (e.g. diffusion regions at the surface of an active region).

Where in this description the word "MEMS" (micro-electromechanical systems) is used, this should also be construed to include NEMS (nano-electromechanical systems). Wherein this description the word deep-submicron process technology is used, this should also be construed to include nanotechnology.

Figure 2:
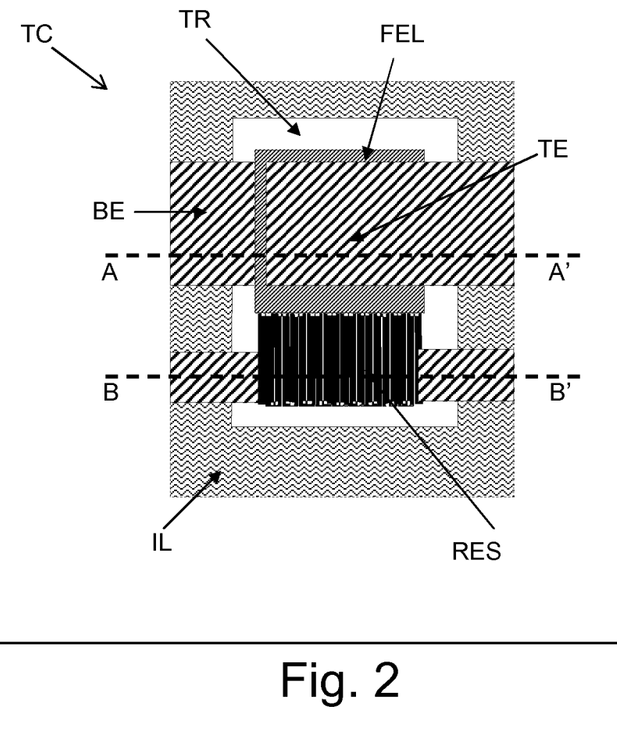
FIG. 2 shows an electronic device comprising a tunable capacitor in accordance with a first embodiment of the invention.
Figure 3A:
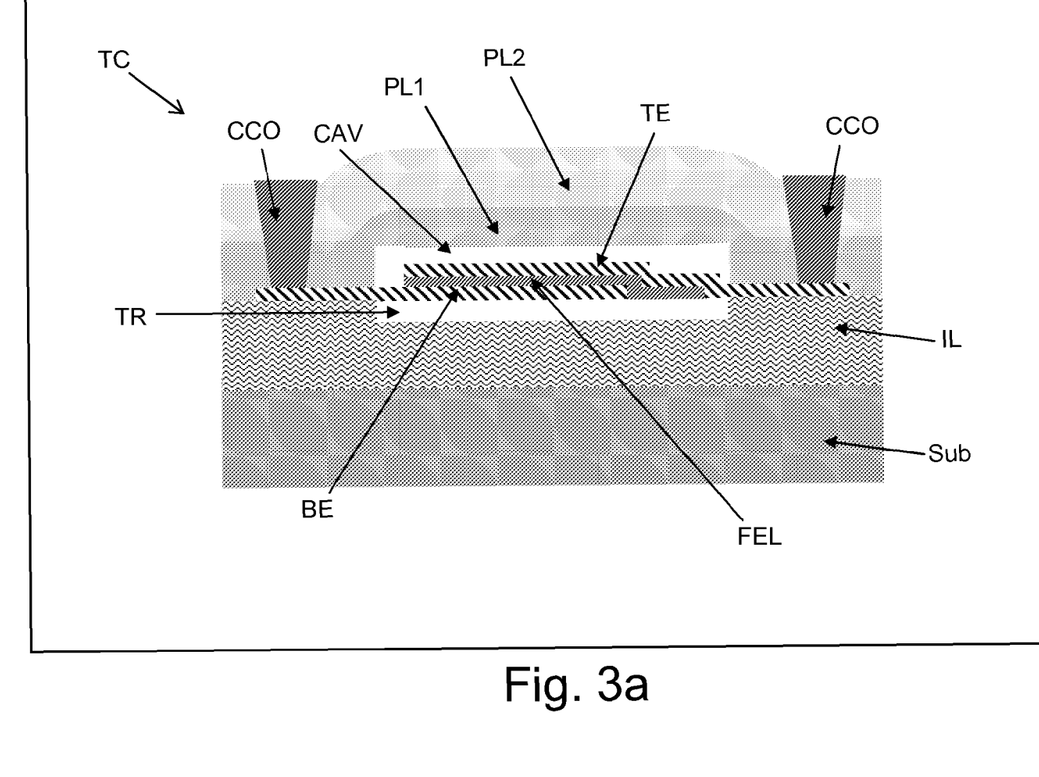
FIG. 3a shows a first cross-sectional view of the electronic device of FIG. 2 along line AA' after finishing of the BEOL processing.
Figure 3B:
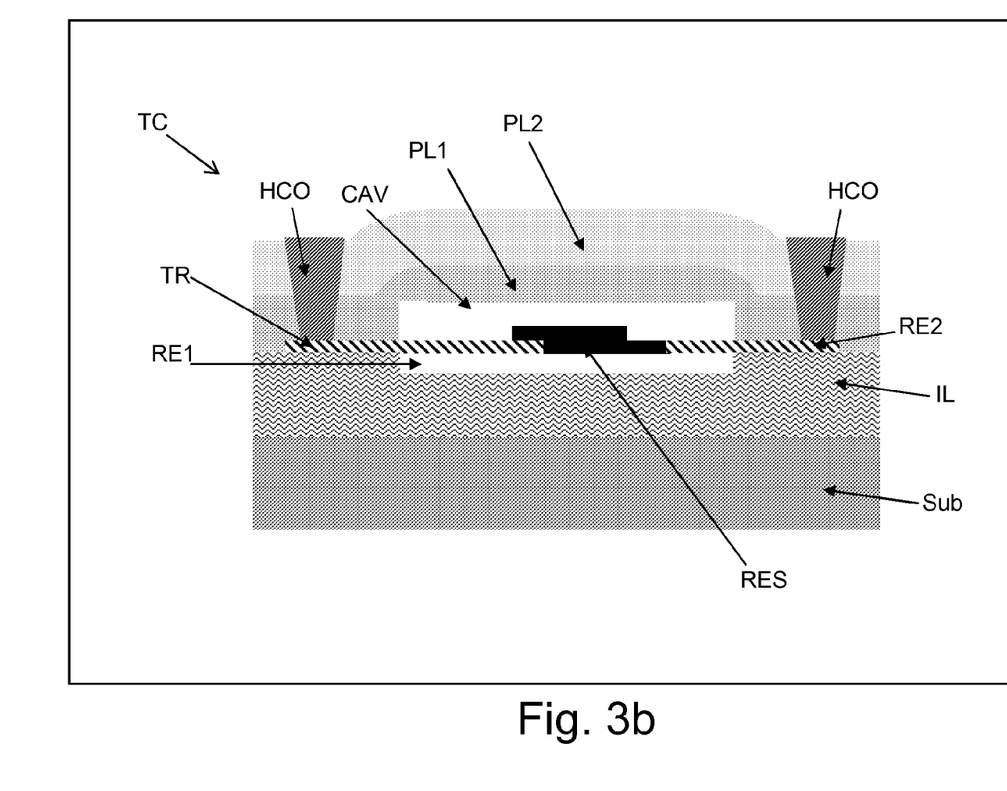
FIG. 3b shows a second cross-sectional view of the electronic device of FIG. 2 along line BB' after finishing of the BEOL processing.

FIG. 2 shows an electronic device comprising a tunable capacitor in accordance with a first embodiment of the invention. In this figure the dielectric layer, the passivation layer and the contacts have been left out for clarity reasons. FIG. 3a shows a first cross-sectional view of the electronic device of FIG. 2 along line AA' after finishing of the BEOL processing. FIG. 3b shows a second cross-sectional view of the electronic device of FIG. 2 along line BB' after finishing of the BEOL processing. The electronic device TC comprises a substrate Sub which may comprise silicon for example, provided with an insulating layer IL thereon, which may comprise materials like silicon oxide. The insulating layer IL has been provided with a trench TR. Above the trench a capacitor stack has been provided comprising a bottom electrode BE, a dielectric FEL, and a top electrode TE. The bottom electrode BE is fed to one side of the device TC and the top electrode TE to an opposing side. The structure is further covered with a first passivation layer PL1, and the first passivation layer PL1 is covered with a second passivation layer PL2. The bottom electrode BE and the top electrode are contacted by means of a capacitance contacts CCO. The capacitor stack is located in a cavity CAV which is formed by the trench TR in the insulating layer IL and extends into the first passivation layer PL1. Adjacent to the capacitor stack a temperature varying means is provided which comprises heater in the form of a resistive element RES between resistive element electrodes RE1, RE2. The resistive element electrodes RE1, RE2 are contact by heater contacts HCO. A resistive element RES may only be used to generate heat with respect to the environment. In case a temperature has to be set which is lower than the environmental temperature a cooler may be required, for example a Peltier element. The advantage of a Peltier element is that it may be used for heating as well as cooling depending on the direction of a current which runs through it. This effect may be used to set a temperature faster.

The capacitor stack preferably comprises a thin ferroelectric layer FEL between relatively thick metal electrodes. The thickness of the ferroelectric layer FEL lies preferably in the range of 10 nm to 1000 nm. The metal electrodes may comprise, for example, a 500 nm gold (Au) layer on a 100 nm platinum (Pt) layer. This metal stack ensures a high-Q factor, even at higher frequencies. Nevertheless, also other materials may be used. Any metal which is commonly used for IC processing is possible, such as Cu, Al, TiN, W, Ti, Ni. Still, inert metals are preferred because other metals (like Cu, Al, and Ti) may oxidize (creating a layer of CuO, $Al_2O_3$, $TiO_2$ respectively). Surface oxidization of the electrodes BE, TE decreases the total capacitance of the stack. Another problem with some metals is that they may diffuse into each other and make an alloy. This typically decreases conductivity. Barrier layers may be needed to prevent diffusion of metals. Proper choice of a metal stack is needed because the ferroelectric dielectric material in the capacitor stack needs a good interface for adhesion with the electrodes and for better electrical properties at high frequency.

In case of gold electrodes the layer thickness lies preferably between 100 nm and 1 μm, and in case of aluminum electrodes the layer thickness lies preferably between 1 and 5 μm Al (for adhesion a barrier layer is needed on a platinum layer of 50 nm to 1 μm). Because noble metals are expensive, the layer thickness must be kept as low as possible. Another disadvantage of thick layers is that is may cause etching problems (in particular for more 1 um thick metal). Moreover, the surface of the metal will become rough for thicker films. On the other side, thinner electrodes may create reliability problems and decrease of conductivity. This is a clear trade-off for the designer.

The size of the plate of the capacitor stack is in this example: 50 nm×50 nm~2500 $nm^2$.

As mentioned earlier, the capacitance created depends on:
the distance between the electrodes, being equal to the thickness of the dielectric layer (t);
the material of the dielectric layer ($\in = \in_0 \cdot \in_r$), and
the area of the plates of the capacitor (A).

From the above it is observed that a thin dielectric layer corresponds with a large capacitance, and vice versa. Thin means a thickness close to 10 nm, and thick means a thickness close to 1000 nm. The dielectric layer is preferably an epitaxial layer, because that generally provides for higher dielectric constants. In case the dielectric layer gets too thin, i.e. thinner than 10 nm, a short circuit may be created between the electrodes BE, TE, because of possible inhomogenity of the dielectric layer thickness. In order to be save a layer of at least 30 nm is advisory. Also, a too thin dielectric layer may be detrimental for the life time of the electronic device.

The resistive element RES could be made of any highly resistive materials like: tantalum nitride (TaN), tungsten (W), thin film metal or phase change material. These materials are generally available in an IC processing environment. The size of the resistive element RES may be same as the capacitor stack, which make it easy to process.

The capacitor stack and the resistive element are surrounded by a cavity. Although, this is not essential, it does provide for a better insulation of the structure. The cavity, most likely comprising air or at least gas, has a low thermal conductivity and heat loss is thus reduced. Heat loss is further reduced if the area of the capacitor stack and resistive element are kept small. A lower heat loss results in a lower power consumption of the capacitor.

In the device as illustrated in FIG. 2 and FIGS. 3a-3b, the dielectric comprises a ferroelectric layer FEL. It must be stressed that this is not essential. Non ferroelectric materials may also exhibit a relative dielectric constant that is of significance within an operation temperature range of the electronic device. The advantage of ferroelectric materials, however, is that these materials exhibit so-called phase changes when the temperature is increased to a level above the so-called Curie temperature. This phase change coincides with a steep increase in the relative dielectric constant. In other words, a large tuning ratio of the capacitance may be achieved when ferroelectric materials are used.

The electronic device of FIGS. 2-3b operates as follows. When a current flows through the resistive element RES, the resistive element heats the ferroelectric material FEL (sets a temperature thereof). In order to be able to actually heat the ferroelectric material, for example $BaTiO_3$) it is required that there is a thermal coupling between the two elements. When the elements are arranged side-by-side as in the figure, this is assured. Alternative, heat transfer may be further improved by adding a so-called heat conducting bridge (not shown). This bridge could be formed by a common membrane on which both, the resistor and the capacitor, reside. Due to the heat the ferroelectric material may change its crystal structure, which, in most ferroelectric materials, has severe impact on the relative dielectric constant. The higher the current through the resistive element RES, the more heat is generated, the higher will be the temperature of the ferroelectric material, which will vary the dielectric constant of the ferroelectric material. In other words, the invention achieved that the relative dielectric constant, and thereby the capacitance, is controlled by the electric current through the resistive element RES. If the electric current is interrupted, the material will cool down, causing its crystal structure to return to its original crystal structure.

The electronic device according to the invention is of use even if no crystal structure change is desired, for example if the relative dielectric constant should be kept at a constant level irrespectively of the environmental temperature. In such application a material must be selected which has a very low temperature dependency within the temperature range of interest (the $\in_r(T)$-graph should run substantially horizontal over a significant temperature range).

In the example embodiment of FIGS. 2-3b only one heating element (resistive element) is illustrated. An improvement may comprise the provision of more heating elements for improving the heat exchange between the heater and the dielectric/ferroelectric material. In the example embodiment of FIGS. 2-3b the heating element and the capacitor plate are provided side by side. Alternatively, they may be provided on top of each other or both. Many variations are possible. However, what is important is that there is a thermal coupling between the two elements.

In order to guarantee a stable capacitance value, the electronic device may comprise a control system. Such a control system, when properly designed ensures a stable temperature and thus a stable capacitance.

Figure 4:
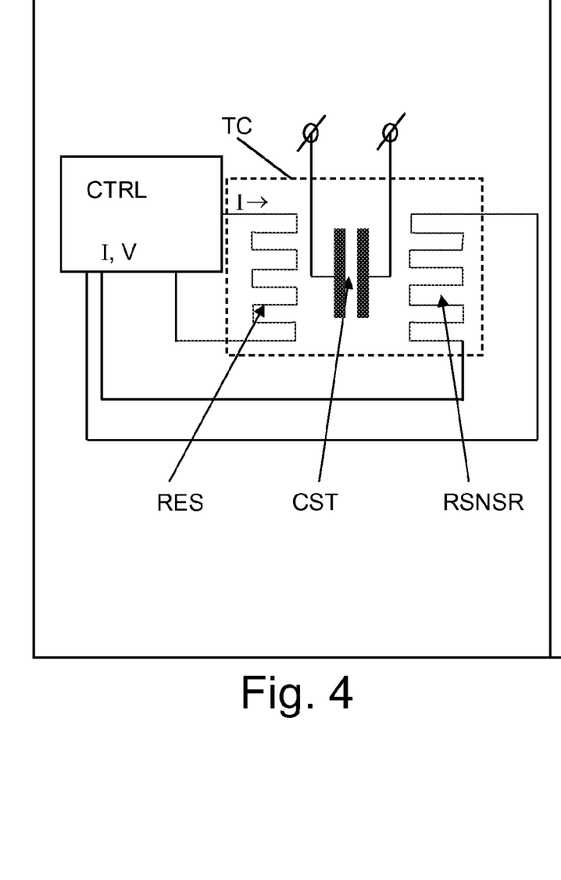
FIGS. 4 and 5 show different embodiments of a control system comprising the electronic device in accordance with the invention.
Figure 5:
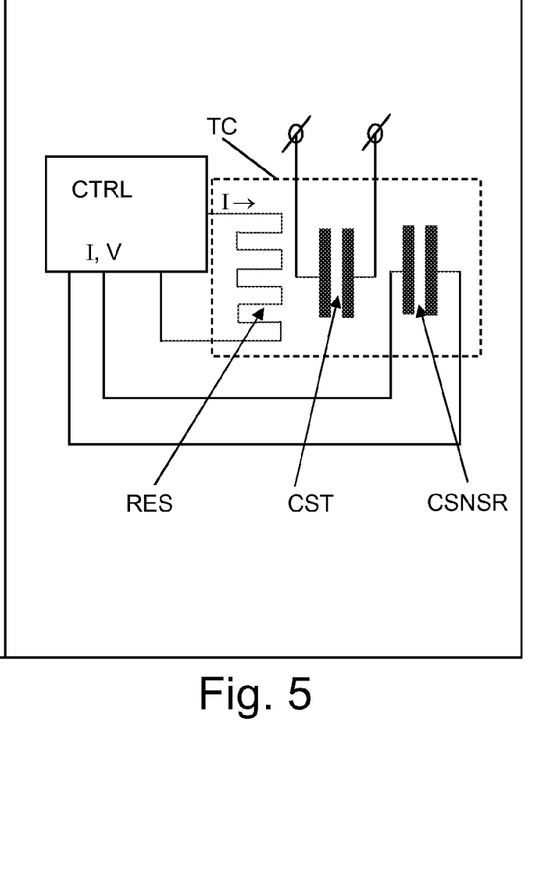

FIGS. 4 and 5 show different embodiments of a control system comprising the electronic device in accordance with the invention. The control system of FIG. 4 comprises the electronic device comprising the tunable capacitor TC. The tunable capacitor TC comprises, next to a capacitor stack CST and the resistive element RES, a further resistive element RSNSR. This further resistive element RSNSR is arranged to act as a temperature sensor. The purpose of the temperature sensor is to measure the temperature around the capacitor stack CST and to provide this measurement as input data to a controller CTRL. The controller CTRL steers the resistive element RES, the resistive element RES heats the capacitor stack CST and the resistor temperature sensor RSNSR. The sensor RSNSR, the controller CTRL and the resistive element together form part of a control loop. The controller CTRL is arranged to minimize an absolute difference between an actual value of the temperature and a desired value of the temperature (input for receiving such a value is not shown). The controller operates as follows: When a measured temperature drops the controller CTRL increases the current I through the resistive element RES to maintain preferable temperature. When a measured temperature increases the controller CTRL decreases the current I through the resistive element RES to maintain preferable temperature. Control systems are well known to the person skilled in the art. PID controllers are commonly used to control temperature.

The control system of FIG. 5 deviates from the system of FIG. 4, in that the resistive sensor RSNSR has been replaced by a capacitive sensor CSNSR. The advantage of this embodiment is that the capacitive sensor CSNSR may be used in different ways. It may be used to measure the temperature, which is used by the controller to regulate the current I through the resistive element RES. Alternatively, it may be used to directly measure an actual value of the capacitance. If the capacitive sensor and the capacitor stack CST are designed similar and if both sensors have a similar thermal coupling to the resistive element RES (the resistive element may be placed in between), the value of the capacitance of the capacitance sensor CSNSR is the same as that of the capacitor stack CST. The measured capacitance value may be used to control the current through the resistive element RES. The ferroelectric capacitor and the capacitive sensor CSNSR may also be designed such that they share their dielectric (ferroelectric) layer. In that embodiment two separate electrodes may be provided on each side of the ferroelectric layer, wherein one electrode pair serves as electrodes of the tunable capacitor stack CST and the other electrode pair serves as electrode of the capacitive sensor stack CSNSR.

Parallel plate capacitance may be measured by biasing a capacitor with a DC voltage (V) between its electrodes and determining the trapped charge (Q) in the capacitor. The capacitance can then be determined using the formula: $C=Q/V$. Another way of measuring capacitance comprises impedance measurement with an AC bias voltage. The capacitance can be extracted from the measured impedance. Both types of measurements are well-known to the person skilled in the art.

In the method of manufacturing the electronic device of the invention many different embodiments exists. In any case, the electronic device of the invention may be manufactured using process steps which as such are known from the prior art. For example, the creation of a cavity may be done by deposition of sacrificial materials (i.e. oxides) and selective etching for removing the sacrificial material. Sacrificial layers and selective etching are techniques which are well known to the person skilled in the art.

A method of manufacturing an electronic device in accordance with the invention comprises steps of:

providing a tunable capacitor CST comprising a first electrode, a second electrode, and a dielectric FEL arranged between the first electrode and the second electrode, wherein the dielectric FEL comprises dielectric material having a value of a relative dielectric constant ($\in r$) varying at least within the operation temperature range, and providing a temperature varying means RES such that it is thermally coupled to the tunable capacitor for providing a temperature of the dielectric FEL causing a predetermined capacitance of the tunable capacitor CST.

In this method the tunable capacitor CST and the temperature varying means RES may be manufactured simultaneously, one after another, or they may share processing steps. This also depends on whether the two elements are arranged side-by-side or on top of each other.

In an example embodiment of the method in accordance with the invention, the method comprises step of:

Method of manufacturing a semiconductor device according to any of claims 1-5, comprising the steps of:

providing a silicon (Si) substrate, preferably with an (100)-orientation;

growing of a dielectric layer, for example silicon oxide (SiO$_2$), preferably with a thickness between 100 nm and 1000 nm, for example a thickness of 500 nm;

patterning of the SiO$_2$ layer to form a trench;

depositing a sacrificial layer, such as sacrificial organic material or a sacrificial oxide, for example silicon oxide (SiO$_2$), preferably with a thickness between 50 nm and 1000 nm, for example a thickness of 200 nm;

planarizing the sacrificial layer, for example by CMP, to obtain the trench filled with sacrificial material;

depositing an first electrode layer (materials may be selected as earlier described in this description), preferably with a thickness between 50 nm and 500 nm, for example a thickness of 100 nm;

patterning the first electrode layer;

depositing a ferroelectric layer (thickness and materials as earlier described);

patterning the ferroelectric material;

depositing a resistive layer (thickness and materials as earlier described);

patterning the resistive layer;

selectively removing the sacrificial layer, which is done by a curing step in case the sacrificial layer is an organic material which evaporates the organic material (temperature between 200° C. and 500° C., for example 400° C. and a duration of 10 seconds to 2 hours, and which is done by a selective etching step (for example by means of a HF etchant) in case the sacrificial layer is a sacrificial oxide;

depositing a second electrode layer (materials may be selected as earlier described in this description), preferably with a thickness between 50 nm and 500 nm, for example a thickness of 100 nm;

patterning the second electrode layer;

depositing a further sacrificial layer, such as sacrificial organic material or a sacrificial oxide, for example silicon oxide (SiO$_2$), preferably with a thickness between 50 nm and 1000 nm, for example a thickness of 200 nm;

patterning the further sacrificial layer;

deposition of a porous hard mask, preferably comprising silicon oxide or silicon nitride having a thickness between 50 nm and 200 nm;

selectively removing the further sacrificial layer, which is done by a curing step in case the sacrificial layer is an organic material which evaporates the organic material (temperature between 200° C. and 500° C., for example 400° C. and a duration of 10 seconds to 2 hours), and which is done by a selective etching step (for example by means of a HF etchant) in case the sacrificial layer is a sacrificial oxide;

passivating the structure by depositing a dielectric layer, preferably formed of a stack of a first passivation layer preferably comprising SiO$_2$ with a thickness ranging from 50 nm to 1000 nm, for example a thickness of 500 nm and a second dielectric passivation layer preferably comprising Si$_3$N$_4$ with a thickness ranging from 50 nm to 1000 nm, for example 500 nm, and providing contacts to the electrodes by means of etching vias in the passivation layers, and subsequently filling the vias with a conductive material, for example aluminum (Al), Copper (Cu) with TiN barrier, tungsten (W), etc. The diameter of the contacts is preferably between 20 and 80 nm.

The steps in the above described embodiment of the method that relate to the sacrificial material and the selective etchant to form a cavity are optional. Additional steps may comprise the provision of the heat conducting bridge as earlier described. This bridge may comprise an extra support layer under a junction between ferroelectric material and the resistive element material. The two steps of selectively removing the sacrificial layers may be combined in one step.

The main advantages of the electronic device in accordance with the invention are:

A high tuning ratio of the tunable capacitor: depending on the material selected for the dielectric the tuning ratio ($\in_{max}/\in_{min}$) can be between 5 and 20, wherein ferroelectric materials seem the most promising because of their extremely large change in dielectric constant at their Curie temperature.

A smaller size, in particular in comparison with the MEMS-type tunable capacitors: for example, in the case of an RF MEMS switch, a large electrode area is needed to obtain a large capacitance and a large tuning ratio. The main reasons for obtaining a smaller device are (i) that the invention features the use of materials having a very high dielectric constant especially when kept around their Curie temperature, and (ii) that in the case of MEMS-type tunable capacitors a minimum size is needed to obtain a structure that has an electrostatic force which exceeds the mechanical forces of the movable element. A typical RF MEMS switch may have an electrode area of 100 µm×100 µm depending on the frequency requirement. A tunable capacitor in accordance with the invention may easily be as low as $\frac{1}{1000}^{th}$ of that size.

A very stable capacitance value is achievable by means of a precise control of the temperature using a temperature control system, which means a high accuracy of the tunable capacitor, independent of circumstances.

The idea of using heat to vary a capacitance may easily be combined with the known methods of varying a capacitance, like a combination of electrical and thermal tuning.

The invention may be applied in a wide variety of application areas, for example mobile communication applications such as tunable filters, phase shifters, multiplexers, voltage-controlled oscillators and tunable matching networks. However, there are many more application areas where tunable capacitors are used.

Various variations of the semiconductor device and electronic system in accordance with the invention are possible and do not depart from the scope of the invention as claimed. These variations for example relate to material choice, layer thickness, spatial arrangement of the elements, etc. Also, in the method of manufacturing a semiconductor device in accordance with an embodiment of the method of the invention, many alterations are possible. Such alterations fall within the normal routine of the person skilled in the art and do not deviate from the inventive concept here disclosed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim.

The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. An electronic device having an operation temperature range, the electronic device comprising:
    a tunable capacitor comprising a first electrode, a second electrode, and a dielectric arranged between the first electrode and the second electrode, wherein the dielectric comprises dielectric material having a value of a relative dielectric constant varying at least within the operation temperature range;
    a temperature varying means being thermally coupled to the tunable capacitor for controlling the temperature of the dielectric thereby causing a predetermined capacitance of the tunable capacitor, the temperature varying means including a resistive element for carrying current;
    a controller being coupled to the resistive element and being arranged for controlling the temperature of the dielectric by steering the current through the resistive element; and
    a temperature sensor for measuring an actual value of the temperature of the dielectric material, wherein the controller is arranged for receiving from the temperature sensor a temperature signal indicative of the actual value of the temperature, the controller being further arranged for receiving a desired temperature signal indicative for a desired temperature, and wherein the controller is arranged for controlling the temperature to decrease an absolute difference between the temperature signal and the desired temperature signal.

2. The electronic device as claimed in claim 1, further comprising capacitance measurement circuitry for measuring an actual value of the capacitance, wherein the controller is arranged for receiving from the capacitance measurement circuitry a capacitance signal indicative for the actual value of the capacitance, the controller being further arranged for receiving a desired temperature signal indicative for a desired capacitance, and wherein the controller is arranged for controlling the temperature to decrease an absolute difference between the capacitance signal and the desired capacitance signal.

3. The electronic device as claimed in claim 1, wherein the dielectric comprises ferroelectric material which exhibits a phase transition from a ferroelectric phase to a paraelectric phase in a temperature range from −50° C. to 250° C.

4. The electronic device as claimed in claim 3, wherein the ferroelectric material exhibits a phase transition from a ferroelectric phase to a paraelectric phase in a temperature range of 50° C. to 150° C.

5. The electronic device according to claim 1, wherein the dielectric (FEL) comprises ferroelectric dielectric material (FEL) selected from one of a number of groups comprising: a tungsten-bronze group comprising $K_3Li_2Nb_5O_{15}$ or $Ba_2NaNb_5O_{15}$, a KDP group comprising $KH_2PO_4$, $KD_2PO_4$, $RbH_2PO_4$, or $KH_2AsO_4$, a $LiNbO_3$ group comprising $LiNbO_3$ or $LiTaO_3$, and a Perovskite group comprising $BaTiO_3$, $PbTiO_3$, or $KNbO_3$, and a $Pb_5Ge_3O_{11}$ group.

6. The electronic device according to claim 5, wherein the dielectric material comprises material from the Perovskite group that complies with the following chemical formula: $XYO_3$, wherein X comprises and least one of Ba, Pb, Sr, Ca, and wherein Y comprises at least one of Sn, Hr, Zr, Ce, Ti, and Th.

7. The electronic device according to claim 6, wherein X comprises $Ba_{1-x-y}Sr_xPb_y$ with $0 \le x < 1$, $0 \le y \le 1$, $x+y \le 1$.

8. The electronic device according to claim 6, wherein Y comprises at least $Ti_{1-z}Zr_z$ with $0 \le z \le 1$.

9. The electronic device as claimed in claim 1, comprising a substrate with insulating material provided at a surface thereof, wherein the capacitor and the temperature varying means are arranged within the insulating material, and wherein the capacitor and the temperature varying means are thermally coupled to each other.

10. The electronic device as claimed in claim 9, wherein the insulating material comprises a cavity in which the capacitor and the temperature varying means are both arranged.

* * * * *